United States Patent [19]
Hagen et al.

[11] 3,813,056

[45] May 28, 1974

[54] MICROFILM CARTRIDGE AND ADAPTER APPARATUS

[75] Inventors: James M. Hagen, Riverside; Clayton M. Haigh, Covina, both of Calif.

[73] Assignee: Xerox Corporation, Stamford, Conn.

[22] Filed: Feb. 20, 1973

[21] Appl. No.: 333,577

Related U.S. Application Data

[63] Continuation-in-part of Ser. No. 205,936, Dec. 8, 1971.

[52] U.S. Cl. ................................ 242/197, 352/72
[51] Int. Cl.... G03b 1/04, G11b 15/32, G11b 23/04
[58] Field of Search ........... 242/194, 195, 197, 200, 242/205; 274/4 B, 4 C, 11 B; 352/72, 78

[56] References Cited
UNITED STATES PATENTS

| | | | |
|---|---|---|---|
| 3,539,131 | 11/1970 | Priest | 242/195 |
| 3,542,311 | 11/1970 | Wangerin | 242/197 |
| 3,547,373 | 12/1970 | Bundschuh | 242/197 |
| 3,744,889 | 7/1973 | Wilsch et al. | 352/72 |

*Primary Examiner*—Leonard D. Christian

[57] ABSTRACT

Apparatus for allowing a cartridge to be utilized with a variety of film viewers. A cartridge adapter, comprising a stationary plate and a plate rotatably mounted thereto, is attached to a viewer. The rotatable plate includes a clamp and is rotatable to a predetermined angle. The clamp is operative to hold a trailer attached to the take-up reel of the film viewer being utilized. A cartridge, including a variable angle film exit port through which a film leader attached to the film within the cartridge extends, is mounted to the cartridge adapter in a manner such that the leader is coupled to the trailer held by the adapter clamp.

23 Claims, 5 Drawing Figures

"3,813,056"

MICROFILM CARTRIDGE AND ADAPTER APPARATUS

RELATED APPLICATION

This application is a continuation-in-part of U.S. Application No. 205,936, filed Dec. 8, 1971.

BACKGROUND OF THE INVENTION

In recent years the market for microfilm viewers and viewer/printers has rapidly increased in proportion to the increase in the generation of documents, computer print-outs, etc. A number of devices are presently available which essentially function to take the output of a computer which previously has been recorded on a tape, for example, and record it on microfilm, thereby allowing the information to be easily stored in a small storage space. The microfilm may then be placed in any one of the numerous viewers or viewer/printers being marketed. The viewer-printers, in general, select a desired frame of the microfilm and project it onto a hard copy output device which makes a hard copy of the frame selected.

In general, rolls of microfilm are either wound upon a reel-type storage member or are encased in a cartridge. One of the major problems in the prior art is that there are many different viewer and viewer/printer machines on the market and these machines only accept a particular cartridge designed for use with that machine. Therefore, if a company is in the business of supplying microfilm in a cartridge to various customers, that company must insure that the cartridge in which the microfilm is encased is compatible with the machine to be used by the customer ordering the microfilm. This places a great burden upon the firm which encases microfilm since it must maintain an inventory of all different types of cartridges and make sure that the microfilm to be delivered is encased in the proper cartridge for the customer.

Therefore, it is apparent that there exists a need for a universal microfilm cartridge which is capable of being used on any microfilm machine from any manufacturer. At this point, it should be noted that reel-to-reel viewer and viewer/printer machines require a certain exit angle of the film from the supply reel. Therefore, in order for a supply cartridge to be used instead of a supply reel, it is necessary that the exit angle of the film from the cartridge correspond with the proper exit angle for that machine. A prior art technique of providing an exit angle in a microfilm cartridge is to provide a fixed exit port on the cartridge. This forces the cartridge to be used only on the specific machine for which it was designed and prevents its use on a machine made by a different manufacturer. Some prior art cartridges, on the other hand, have a large open area which allows some variation in exit angle. However, since one of the main purposes of a cartridge is to seal the film from dust and dirt, these latter cartridges have a great disadvantage. It is therefore apparent that any universal cartridge must have some means provided for varying the exit angle of the film while at the same time preventing dust and dirt from contaminating the film within the cartridge.

SUMMARY OF THE INVENTION

In accordance with the present invention, apparatus is provided for allowing a cartridge to be utilized with most microfilm viewer or viewer/printer (for the sake of brevity, the term "viewer" as utilized hereinafter is defined to include the term "viewer/printer") machines presently on the market designed to operate in a reel-to-reel mode. For each machine, a different mounting plate is provided to be mounted on the machine in the position to be occupied by the supply cartridge. The plate provides an interface between the cartridge adapter and the machine utilized and allows the supply reel inside the cartridge and the takeup reel to be in the same plane for proper film traverse and winding. This plate has provisions for attachment thereto of a novel cartridge adapter which comprises a stationary member mounted to the plate, a member rotatably mounted to the stationary member and at least one guide pin for receiving the cartridge. The rotatable member of the adapter includes a clamp and is rotatable to various angles to accommodate the different film exit angles for the particular machine being utilized. The clamp functions to hold a trailer attached to the takeup reel of the machine so that the machine may be operated in a pre-threaded mode. The cartridge has a variable angle exit port and through that port there extends a film leader attached to the film within the cartridge, the leader being designed to be coupled to the trailer held by the adapter clamp upon mounting of the cartridge onto the adapter guide pins.

It is an object of the present invention to provide apparatus for enabling a film cartridge to be utilized with a variety of film viewers.

It is a further object of the present invention to provide a novel cartridge adapter for enabling a film cartridge mounted thereto to be utilized with a variety of film viewers.

It is still a further object of the present invention to provide a novel film cartridge designed to be mounted to the cartridge adapter described heretofore, whereby the film cartridge can be utilized with a variety of film viewers.

DESCRIPTION OF THE DRAWINGS

For a better understanding of the invention as well as other objects and features thereof, reference is made to the following description which is to be read in conjunction with the accompanying drawing in which.

DESCRIPTION OF THE PREFERRED EMBODIMENT

Figure 1:
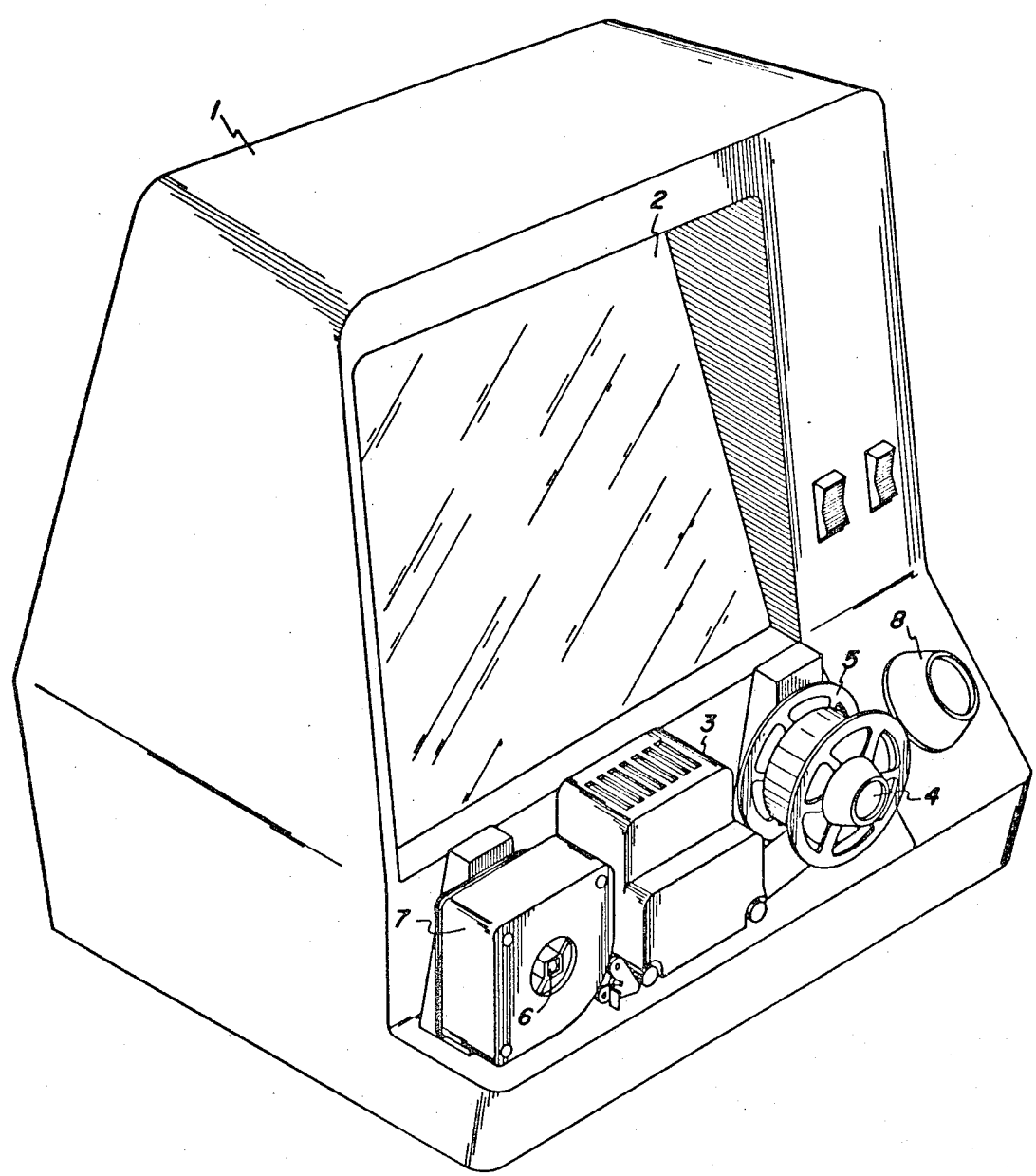
FIG. 1 is a perspective view of a film viewing device in which the apparatus of the present invention may be utilized.

Referring to FIG. 1, there is illustrated a microfilm viewing apparatus in which the apparatus of the present invention may be utilized. As illustrated therein, housing 1 contains a viewing screen 2, a film projection station located beneath lamp housing 3, a takeup spindle 4 for supporting a takeup reel 5, and a supply spindle 6 for supporting a microfilm cartridge 7. As is well known in the art, film is advanced out of cartridge 7 past projection station 3 and onto takeup reel 5 upon the turning of knob 8. As a frame of microfilm passes projection station 3, it is displayed on screen 2.

Figure 2:
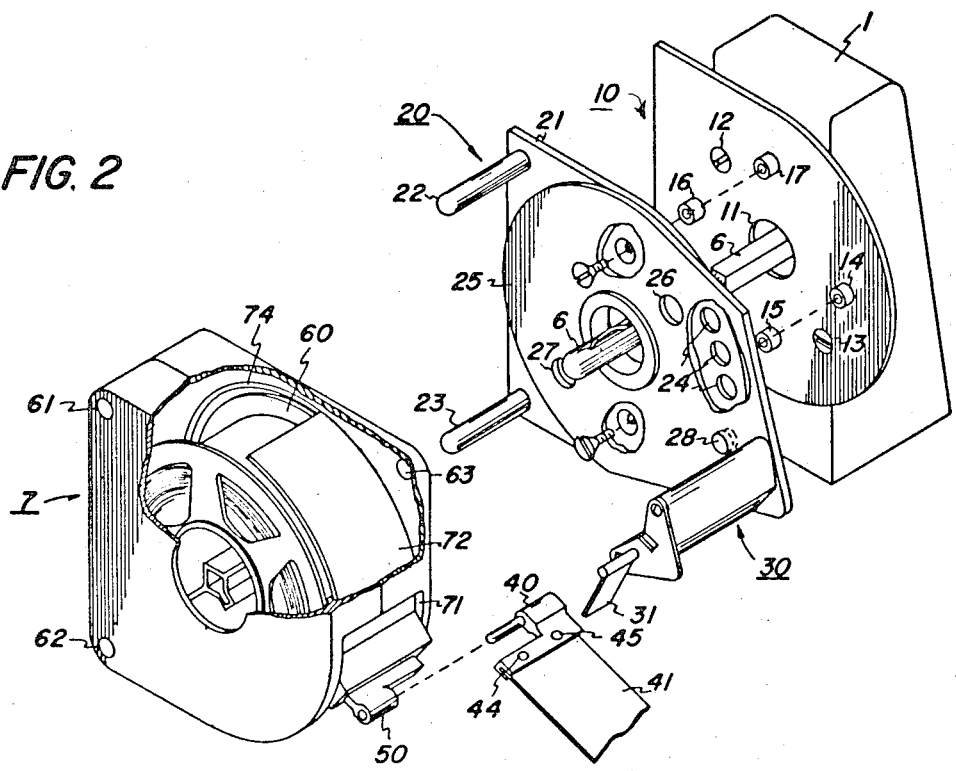
FIG. 2 is an exploded view of a preferred embodiment of the present invention.

Referring now to FIG. 2, an exploded view shows the adapter apparatus for mounting cartridge 7 onto supply spindle 6 attached to housing 1. Mounting plate 10 has an aperture which fits over spindle 6 and is attached to housing 1 by screws 12 and 13. Since viewing machines of different manufacturers have different amounts of space available surrounding the supply spindle, mounting plate 10 is specifically designed for each different viewer. The plate provides an interface between the adapter apparatus and the viewer machine utilized and allows the supply reel inside the cartridge and the takeup reel 5 to be in the same plane for proper film traverse and winding. The mounting plate 10 shown in FIG. 2 is simplified for the purpose of this discussion and is in no way limiting. Even though mounting plate 10 is different for each machine, threaded standoffs 14, 15, 16, and 17 are identical and are spaced in the same relationship to supply spindle 6 regardless of the mounting plate design.

Cartridge adapter 20 is the same regardless of the viewer to be utilized. Adapter 20 comprises a stationary plate 21 attached to standoffs 14, 15, 16, and 17 of mounting plate 10 by means of screws which are countersunk beneath the surface of plate 21. Attached to plate 21 are guide pins 22 and 23 for supporting cartridge 7. Adapter 20 also includes a rotatable plate 25 which rotates around the opening for supply spindle 6. Plate 25 has holes 26 and 27 which are positionable over the holes for the screws which attach plate 21 to the threaded standoffs on plate 10. In order to hold plate 25 at any of the plurality of angles, plate 21 has a series of holes 24 arranged in a circular arc, and on the underside of plate 25 there is a protrusion 28 which fits into any one of the holes 24 but may be readily moved manually from one hole to the next.

Also part of adapter 20 and attached to plate 25 is clamp 30 which functions to hold one piece of a two-piece film connector which is attached to a film trailer passing through projection station 3 and onto takeup reel 5. Clamp 30, in the embodiment shown in more detail in FIG. 4, comprises a pair of jaws which may be forced together by locking lever 31 so as to engage and hold connector piece 40 attached to trailer 41. The other connector piece 50 is attached to a film leader which is on the roll of film within cartridge 7. Connector piece 40 may illustratively comprise a pin and connector piece 50 may illustratively comprise a socket. Upon mounting cartridge 7 on adapter 20, the pin of connector piece 40 is engaged in the socket of connector piece 50. Locking lever 31 may then be operated to release the clamping jaws of clamp 30, and the film within cartridge 7 may then be pulled through projection station 3 and onto takeup reel 5.

Cartridge 7 comprises a shell for holding a reel of film 60. This shell has holes 61, 62 and 63 in the front and back walls for accepting guide pins 22 and 23. Any combination of two adjacent holes, i.e., 61 and 62 or 61 and 63, may be used to position cartridge 7 on adapter 20. This allows cartridge 7 to be rotated 90°. Furthermore, cartridge 7 may be positioned on adapter 20 with either wall being outwardly disposed from adapter 20. Cartridge 7 also includes sidewalls, one of which has an elongated opening 71 which is covered by exit 72. For illustrative purposes, opening 71 is shown as defining a 90° arc centered about the supply spindle aperture. Exit member 72 is a strip formed in the shape of a circular arc. Circular grooves 74 are provided in the front and back walls of cartridge 7 and strip 72 moves in these grooves. A slit is provided in exit member 72 for accepting the film contained within the cartridge. This slit may be moved in the 90° arc defined by the elongated opening 71. Since the cartridge may also be rotated 90° in combination with the movement of exit member 72, this gives an effective 180° variation in exit angle. Since the cartridge may be positioned on adapter 20 with either wall facing out, the film may either enter the projection area with the emulsion side up or down. Connector piece 50 is arranged to be wider than the slit so that it remains external to the cartridge at all times.

Figure 3:
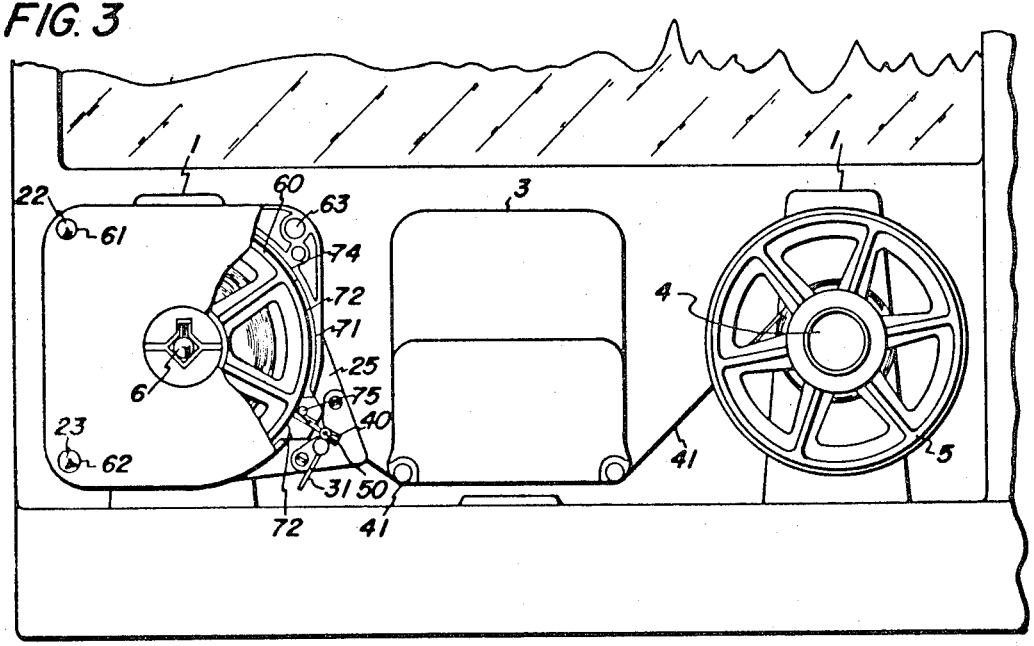
FIG. 3 is a view which depicts the projection area of the film viewing device of FIG. 1 with the embodiment of FIG. 2 mounted in place.

FIG. 3 depicts the projection area of the machine shown in FIG. 1 with apparatus embodying the principles of this invention mounted over supply spindle 6, cartridge 7 being shown partially cut away. Takeup reel 5 is mounted on spindle 4 connected to housing 1, and for the present purposes it is assumed that no film has been advanced onto takeup reel 5 from cartridge 7. One end of trailer 41, however, is attached to takeup reel 5, the free end being advanced through projection station 3. The free end of trailer 41 is attached to connector piece 40 which is held by clamp 30 through the action of locking lever 31. Cartridge 7 is then mounted on supply spindle 6 attached to housing 1, the socket of connector piece 50 fitting over the pin of connector piece 40. When locking lever 31 is operated so as to release connector piece 40 from the hold of clamp 30 and takeup reel 5 is rotated, the film stored in cartridge 7 is pulled past roller 75 in exit member 72, through projection area 3, and onto takeup reel 5 without the necessity for film threading. Conversely, when the supply of film is pulled back into cartridge 7 from takeup reel 5, trailer 41 will be pulled through projection station 3 and positioned so that connector piece 40 is held by clamp 30. When cartridge 7 is taken off supply spindle 6, connector piece 40 will remain held by clamp 30. Therefore, when another cartridge is placed on supply spindle 6, its corresponding connector piece 50 will be attached to connector piece 40, thereby allowing the film in that cartridge to be pulled through projection station 3 and onto takeup reel 5 without the necessity of threading the film of that cartridge.

Figure 4:
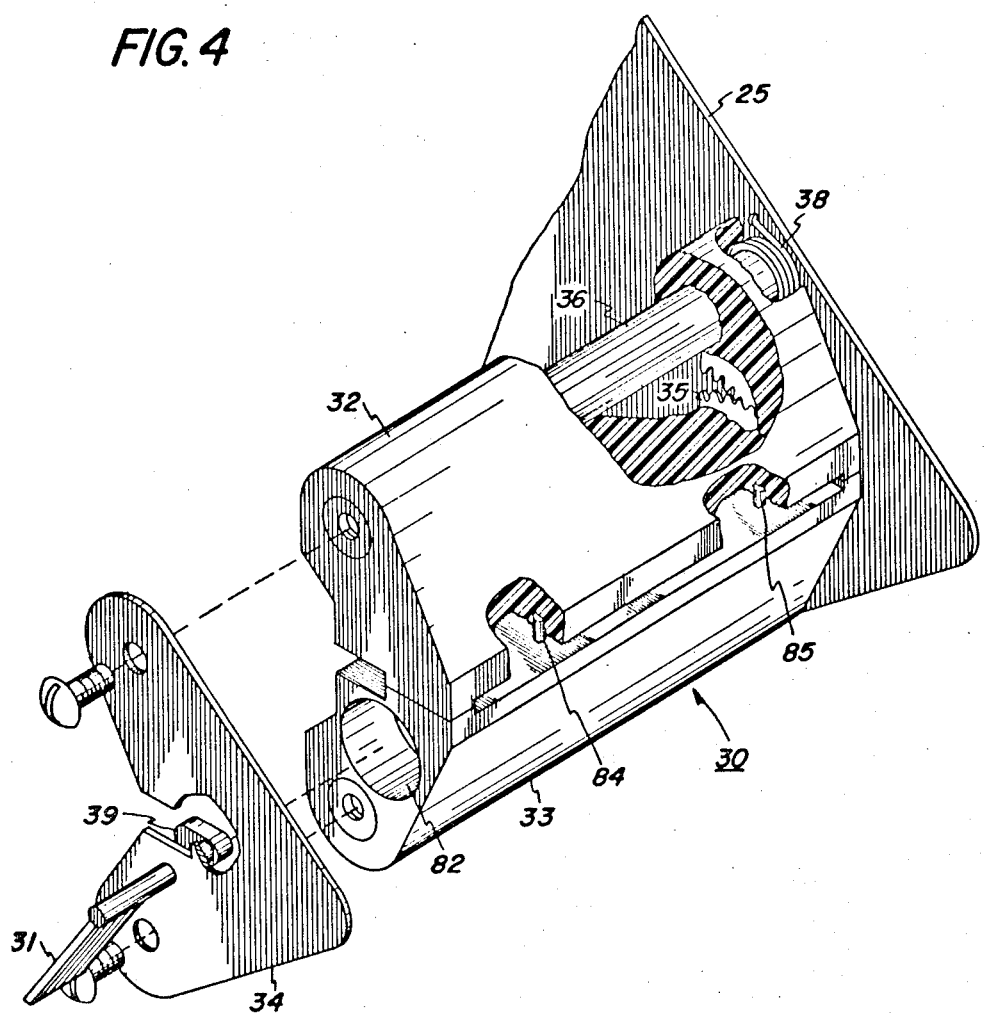
FIG. 4 is a view showing an enlarged, partially cut away and exploded perspective view of the clamp attached to the cartridge adapter of the embodiment of FIG. 2.

Turning now to FIG. 4, there is shown an enlarged, partially cut away and exploded perspective view of clamp 30 which is attached to plate 25 of adapter 20. Clamp 30 comprises a pair of jaws 32 and 33, held by cover plate 34, having interlocking teeth 35. Jaw 32 may be pivoted about pin 36 and jaw 33 is pivoted about a corresponding pin (not shown). Spring 38 around pin 36 is arranged to bias the jaws in an open position. Locking lever 31 has attached thereto a cam 39 which moves within a well 82 in jaw 33. The rotation of lever 31 causes jaws 32 and 33 to pivot about their respective pivot pins. When the jaws are in a closed position and lever 31 remains fixed, the jaws will remain in that closed position. Jaw 32 also includes a pair of pins 84 and 85 which fit into indentations 44 and 45 of connector piece 40 when the jaws are in their closed position, thereby holding connector piece 40 in position to receive the socket of connector piece 50.

Figure 5:
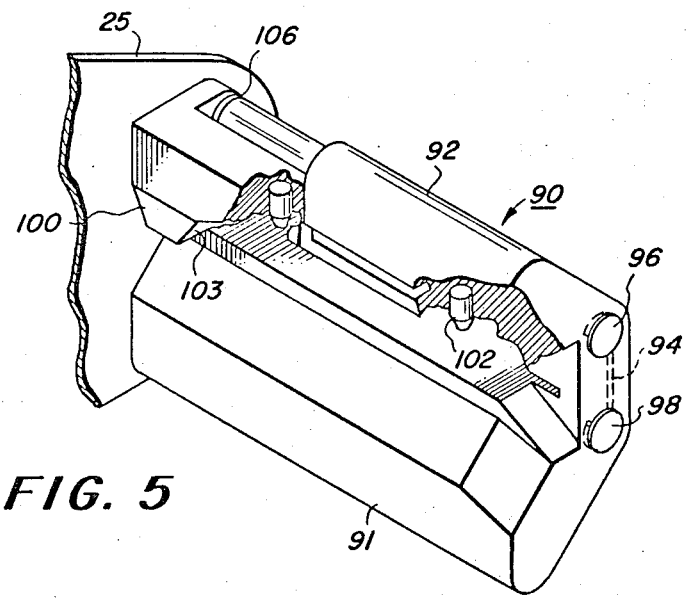
FIG. 5 is a view showing an enlarged partially cut away perspective view of another clamp which may be attached to the cartridge adapter of the embodiment whown in FIG. 2.

FIG. 5 shows a perspective view of a clamp which may be utilized in lieu of clamp 30 shown in FIGS. 2–4.

Clamp 90 comprises a fixed jaw 91 and a pivotable jaw 92, movable between a first, or closed position, to a second, or open position, when cartridge 7 is mounted on at least one of the guide pins 22 and 23. Spring 94, formed around rollers 96 and 98, biases pivotable jaw 92 to the first, or closed position.

As with the initial operation of clamp 30, the free end of trailer 41 is attached to connector piece 40 which is held by clamp 90. In order to open the pivotable jaw to receive connector piece 40, the jaw is caused to pivot toward the open position by, for example, manually moving jaw portion 100. Connector piece 40 is positioned so that indentations 44 and 45 align with pins 102 and 104 formed on pivotable jaw 92. When manual pressure is removed from jaw portion 100, spring 94 biases pivotable jaw 92 towards the closed position, pins 102 and 104 fitting into indentations 44 and 45, thereby holding connector piece 50. Cartridge 7 then is mounted on supply spindle 6. As the slit portion of exit member 72 is inserted into the jaws of clamp 90, it contacts the sloped, or cammed surface 103 of jaw portion 100. As cartridge 7 continues to enter the clamp, the camming action of the exit member on the sloped surface 103 forces the jaw 92 to pivot about pivot point 106, to its fully open position. At this point, the pin of connector piece 40 fits into the socket of connector piece 50. With pivotable jaw 92 in the open position, the film contained in cartridge 7 can be removed in the same manner as described with reference to FIG. 3 hereinabove without the necessity for film threading. When the supply of film is pulled back into cartridge 7, trailer 41 will be positioned so that indentations 44 and 45 are aligned with pins 102 and 104, respectively. When cartridge 7 is taken off supply spindle 6, spring 94 biases pivotable jaw 92 to the closed position, thereby holding connector piece 40 in position to receive the connector piece 50 of another cartridge mounted on supply spindle 6.

Accordingly, there has been described apparatus for allowing a cartridge to be utilized with any reel-to-reel microfilm viewer or viewer/printer. It is understood that the above described apparatus is merely illustrative of the application of the principles of this invention. Numerous other apparatus arrangements may be devised by those skilled in the art without departing from the spirit and scope of this invention.

What is claimed is:

1. In combination with a film viewer having a spindle for receiving a film supply member
    an adapter for attachment to said viewer having an opening therein for accepting said spindle, said adapter having a first member for attachment to said viewer including at least one pin thereon for receiving and supporting a film cartridge and said adapter further having a second member rotatably mounted on said first member including clamping means attached to said second member for receiving the leading end of a film located in a cartridge supported on said at least one pin, and
    a film cartridge for mounting on said spindle and said at least one pin, said cartridge having a movable film exit port positionable to the vicinity of a line from said spindle to said clamping means.

2. The combination of claim 1 wherein said first member of said adapter has a plurality of apertures therein and said second member of said adapter has a protrusion on the side adjacent to said first member, said protrusion being positionable in any one of said apertures.

3. The combination of claim 2 wherein said cartridge comprises a pair of parallel spaced walls each having an interior groove, and said movable exit port comprises an arcuate member movable in said grooves, said arcuate member having a slit therein for accepting film.

4. In combination
    a film viewer having a supply spindle and a takeup spindle,
    a film connector having a first piece and a second piece,
    a takeup reel mounted on said takeup spindle having a film trailer with one end connected to said takeup reel and the other end attached to said first piece of said connector,
    an adapter having an opening therein for accepting said supply spindle, said adapter having a first plate mounted on said viewer including at least one pin thereon for receiving and supporting a film cartridge and said adapter further having a second plate rotatably mounted on and parallel to said first plate including clamping means attached to said second plate for receiving and holding said first piece of said connector, and
    a cartridge mounted on said supply spindle and said at least one pin containing film therein, said film having a leader attached to said second piece of said connector, said cartridge having a movable exit port for said film positionable to the vicinity of a line from said supply spindle to said clamping means, said leader extending through said exit port with said second connector piece external to said cartridge, said second connector piece being connected to said first connector piece upon the mounting of said cartridge on said supply spindle and said at least one pin, whereby said film in said cartridge may be pulled by said trailer onto said takeup reel.

5. The combination of claim 4 wherein said first connector piece comprises a pin and said second connector piece comprises a socket.

6. The combination of claim 5 wherein said clamping means comprises a pair of clamping plates at least one of which is pivotable about an axis perpendicular to the plane of said second plate and means for pivoting said pivotable clamping plate so as to hold said first connector piece between said pivotable clamping plate and other clamping plate.

7. In combination with a film viewer having a supply spindle, a takeup spindle, and a projection area intermediate said spindles, apparatus for providing a plurality of angles for film to enter said projection area from said supply spindle comprising
    a film connector having a first piece and a second piece,
    a takeup reel mounted on said takeup spindle having a film trailer with one end connected to said takeup reel and the other end attached to said first piece of said connector, the intermediate portion of said film trailer being advanced through said projection area, a plate for mounting on said viewer over said supply spindle, an adapter for attachment to said plate having an opening therein for accepting said supply spindle, said adapter having a first plate including means for fixedly holding a film cartridge on said supply spindle, said adapter further having a second plate rotatably mounted on said first plate including clamping means attached to said second plate for receiving and holding said first connector pieces, and a cartridge mounted on said holding means of said first plate containing film therein, said film having a leader attached to said second piece of said connector, said cartridge having a variable angle exit port for said film positionable to the vicinity of a line from said supply spindle to said clamping means, said leader extending through said exit port with said second connector piece external to said cartridge, said second connector piece being connected to said first connector piece upon the mounting of said cartridge on said first plate, whereby said film in said cartridge may be pulled by said trailer through said projection area onto said takeup reel.

8. The combination of claim 7 wherein said adapter further comprises means for holding said second plate at any of a plurality of angles of rotation with respect to said first plate.

9. The combination of claim 8 wherein said clamping means comprises a pair of clamping plates at least one of which is pivotable about an axis perpendicuar to the plane of said second plate and means for pivoting said pivotable clamping plate so as to hold said first connector piece between said pivotable clamping plate and the other clamping plate.

10. The combination of claim 9 wherein said film connector comprises a pin and socket.

11. A film cartridge for mounting on a spindle comprising:

a shell for holding film, said shell having first and second parallel spaced walls each with an aperture to accept said spindle and a plurality of sidewalls perpendicular to the planes of said first and second spaced walls, said sidewalls separting said first and second spaced walls and one of said sidewalls having an elongated opening therein for allowing said film to pass from the interior of said shell, said first and second parallel spaced walls each having a groove centered about said aperture, said first parallel spaced wall having a plurality of openings adapted to receive guide members when mounted on said spindle, and an arcuate shaped exit member positioned in said grooves between said first and second parallel spaced walls and covering said opening, said exit member having a slit to allow the passage of said film there through and movable in said grooves to accommodate a plurality of exit angles of said film from the interior of said shell.

12. In combination with a film viewer having a pair of guide pins and a supply spindle mounted thereon, a cartridge for mounting on said supply spindle and said guide pins comprising:

a shell for holding film, said shell having a pair of parallel spaced walls each with an aperture to accept said spindle and a plurality of sidewalls perpendicular to the planes of said spaced walls, said sidewalls separating said spaced walls and one of said sidewalls having an elongated opening therein for allowing said film to pass from the interior of said shell, said parallel spaced walls each having an interior groove centered about said aperture, said parallel spaced walls each further having a plurality of aligned openings for receiving said guide pins and positioned to allow said cartridge to be mounted on said spindle and said guide pins in a plurality of orientations, and an arcuate shaped exit member positioned in said grooves between said parallel spaced walls and covering said elongated opening, said exit member having a slit for allowing the passage of said film therethrough and movable in said grooves through an arc defined by said elongated opening thereby allowing said film to exit from the interior of said shell through a plurality of exit angles, the mounting of said cartridge in any of said plurality of orientations and the movement of said exit member through the arc defined by said elongated opening providing the cartridge with the capability of allowing the film to exit at angles greater than the arc defined by the elongated opening when the cartridge is mounted on the spindle in a fixed one of said plurality of orientations.

13. The film cartridge as defined in claim 11 wherein the openings receiving said guide members when the cartridge is mounted in a first orientation differ from the holes receiving said guide members when the cartridge is mounted in a second orientation.

14. The film cartridge as defined in claim 13 wherein said second parallel spaced wall has a plurality of openings aligned with the openings on said first spaced wall whereby the guide members extending into the openings on said first spaced parallel walls also extend into the correspondingly aligned hole on said second parallel spaced wall.

15. A cartridge adapter for enabling a film cartridge to be adapted for use with a variety of film viewers comprising:

a stationary plate having at least one pin for guiding and supporting a film cartridge mounted thereon, a plate rotatably connected to said stationary plate, said rotatably connected plate being adapted for rotation to a predetermined position relative to said stationary plate, and clamping means attached to said rotatably connected plate for receiving the leading end of the film located within said film cartridge when the film cartridge is mounted on said at least one guide pin.

16. The cartridge adapter as defined in claim 15 wherein said stationary plate has a plurality of protrusion receiving means therein and said rotatably connected plate has a protrusion on the side adjacent to said stationary plate, said protrusion being positionable in any one of said protrusion receiving means whereby said rotatably mounted plate is secured in a predetermined position.

17. The cartridge adapter as defined in claim 15 wherein said clamping means comprises a pair of clamping plates, at least one of which is pivotable about an axis perpendicular to the plane of said rotatably connected plate, said pivotable clamping plate being positionable from a first to a second position when said film cartridge is mounted on said at least one guide pin.

18. The cartridge adapter as defined in claim 17 wherein said pivotable clamping plate returns to said first position when said film cartridge is removed from said at least one guide pin.

19. Apparatus for enabling a film cartridge having a moveable exit port to be mounted to a film viewer having a spindle comprising:
- a first member for attachment to said film viewer, said first member having an opening therein for receiving said spindle and support means for receiving and supporting said film cartridge, and
- a second member operatively connected to said first member, said second member being adapted for movement to a predetermined angular position relative to said first member and having clamping means attached thereto, said clamping means receiving the leading end of the film located in said film cartridge when the film cartridge is mounted on said support means.

20. Apparatus as defined in claim 19 wherein said support means comprises at least one guide pin adapted to be received by a corresponding opening in said film cartridge.

21. Apparatus as defined in claim 19 further including means for holding said second member at predetermined angular position relative to said first member.

22. Apparatus as defined in claim 19 wherein said clamping means comprises a pair of clamping jaws, at least one of which is pivotable, said pivotable clamping jaw being positionable from a first to a second position when said film cartridge is mounted on said support means.

23. Apparatus as defined in claim 22 wherein said pivotable clamping jaw returns to said first position when said film cartridge is removed from said support means.

* * * * *